United States Patent Office 3,392,258
Patented July 9, 1968

3,392,258
ADAPTATION OF LASER HEADS ON MECHANICAL UNITS, ESPECIALLY ON MICROSCOPES
Marc Bruma, Sceaux, and Michel Velghe, Gif-sur-Yvette, France, assignors to Centre National de la Recherche Scientifique, Paris, France
Filed July 29, 1964, Ser. No. 385,975
Claims priority, application France, July 30, 1963, 943,179
4 Claims. (Cl. 219—121)

ABSTRACT OF THE DISCLOSURE

A micromachining assembly having an active element of a laser head rigidly fixed to the optical portion of a microscope in such a manner that the optical axis of the microscope coincides with the geometrical axis of the active element. A removable optical pumping device is operatively associated with the active element to effect generation of a laser beam. Support means are mounted on the microscope so as to support the optical pumping device for adjustment relative to the active element and microscope. A television camera is optically aligned with the microscope for viewing the workpiece during micromachining thereof.

---

The invention relates to the adaptation of laser heads to mechanical units, especially to microscopes for micromachining operations.

It is known that the laser heads generally employed for micromachining comprise an active element, for example a ruby or a neodymium glass, surrounded by a optical pumping device such as a flash tube in the form of a spiral. The crystal is enveloped by the pumping radiation, the pumping light passing into the crystal through the side walls.

In the arrangements known up to the present time, the active element and the optical pumping device of the laser head are rigidly fixed together, with the result that the adaptation of the said laser heads on mechanical units for micromachining is particularly difficult. It is especially difficult to effect the coupling of a microscope to a laser head, as the optical adjustment of the microscope on a workpiece to be machined and the mechanical adjustment of the laser head on the same workpiece are not independent. In addition, for example, in the case of a microscope, its manipulation and its preliminary adjustments are hampered by the laser head which is bulky and under high voltage.

The applicants have found that there is no necessity to fix solidly together the active element and the optical pumping device on the laser head and that, for the operation of the laser, it is only necessary for the active element and the optical pumping device to be in definite relative positions, but with a certain tolerance.

In consequence, the invention has for its object to obviate the difficulty of coupling a laser head to a mechanical unit and in particular to a microscope.

More precisely, the invention has for its object to couple exactly with the said mechanical unit the only active portion of the laser head, of which the optical pumping device is no longer fixed to the said coupling.

The invention has also for its object to make the optical pumping device of the laser head and its associated parts removable with respect to the said coupling of the active portion of the laser head to the mechanical unit, in order to facilitate adjustments and manipulation between the periods of application of the laser beam.

According to the invention, the active element of the laser head is rigidly fixed to the mechanical portion on which the laser head is to be fitted, and the optical pumping device is mounted independently of the active element. This independence of the two mountings has the advantage of considerably facilitating and rendering invariable the exact optical centering of the crystal on the mechanical and/or optical system or systems of the mechanical portion considered.

The invention further provides that the mounting of the optical pumping device on the mechanical part considered comprises the members necessary for adjusting, in direction and in position, the optical pumping device with respect to the active element of the laser head. These adjustments are desirable in order to obtain the best over-all efficiency.

An improvement according to the invention consists of adding to the said adjustments of the optical pumping device a sliding system which permits, outside the working periods of the laser head, of removing the optical pumping system, which is bulky, fragile, connected to very high voltage, and thereby to liberate all the rest of the apparatus in a particularly advantageous and convenient manner.

In particular, in order to adapt a laser head to a microscope for micromachining, according to the invention, the active element is fixed to the optical portion of the microscope in such manner that the optical axis of the microscope coincides with the geometrical axis of the active element, the optical pumping device being made movable substantially along the axis of the active element.

The device according to the invention enables focussing to be effected on a workpiece to be machined, either by optical focussing or by projection on a ground glass screen, or by reproduction by television, by displacing the optical members and the active element as a unit and then directing the laser beam on the workpiece after having replaced the pumping device.

The fitting of laser heads on mechanical units according to the invention also makes it possible to group together in a single unit a laser head, a focussing device and/or a photographic apparatus or to couple two laser heads to the same microscope.

Different adaptations of laser heads to mechanical units, especially for micromachining, will be described below by way of examples and without any limitation, reference being made to the accompanying drawings, in which.

In all the drawings, the laser head comprises a ruby 1 and a flash tube 2 in the form of a spiral, forming the optical pumping device. It is clear that the ruby may quite well be replaced by a neodymium glass or any other known active element.

Figures 1, 2:
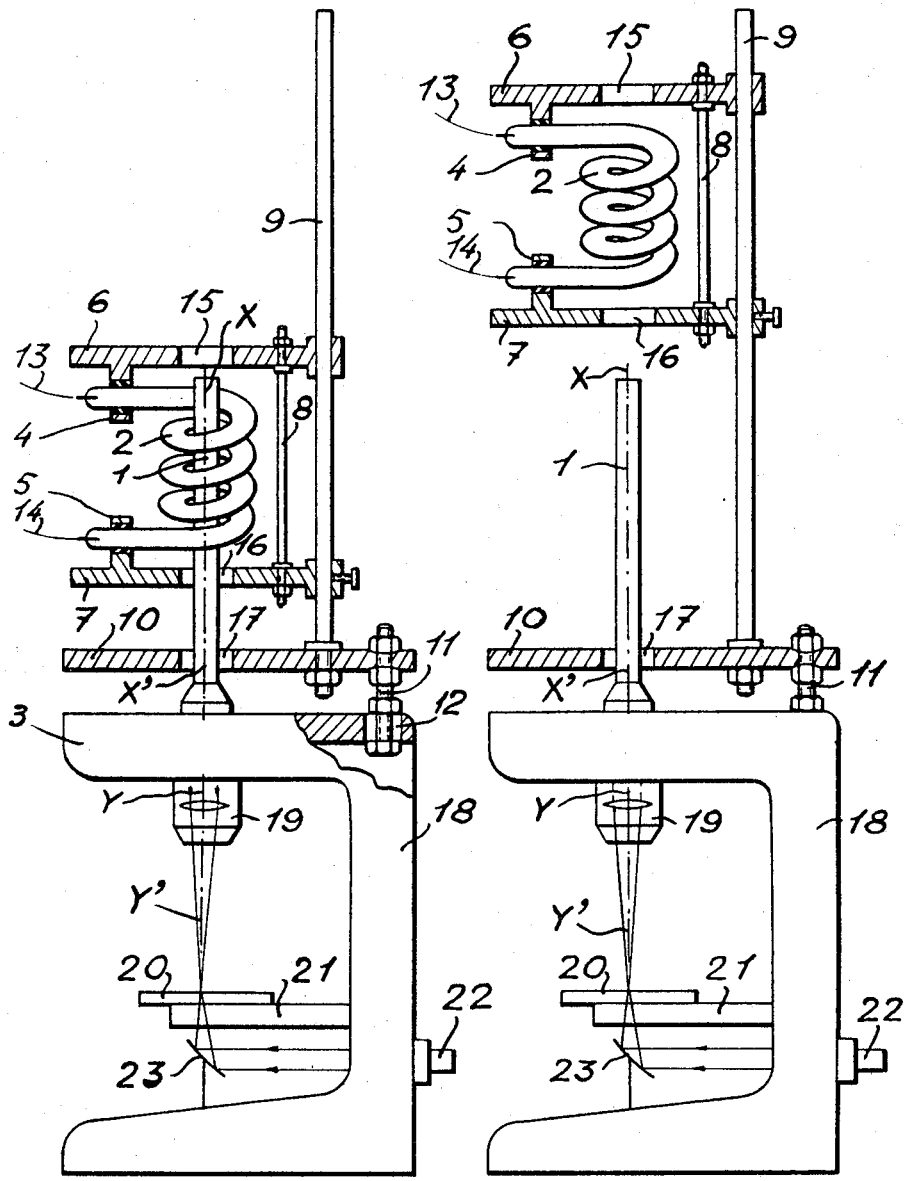
FIGS. 1 and 2 show two positions of a laser head fitted on a microscope, the active element of the laser head being fixed to the microscope while its optical pumping device is movable with respect to the active element.

With reference to FIGS. 1 and 2:

The ruby 1 is supported on a member 3 of the mechanical part considered, and this fixing is effected in a definitive manner after adjustment to obtain precise coincidence of the optical axis XX' of the ruby 1 and the optical axis YY' of the optical system of the mechanical unit 3. The electronic flash tube 2 is mounted, for example by means of two clamps 4 and 5, between two annular end-plates 6 and 7, fixed to each other for example by three bracing struts 8 (of which one only is shown). The assembly of the flash tube 2 and the two end-plates 6 and 7 can slide on three rods 9 (of which one only is shown) held by a third annular end-plate 10. This third end-plate 10 is mounted on the mechanical unit 3, for example by means of three threaded rods 11 (of which one only is shown) co-operating with three slots 12 in the mechanical unit 3 (one slot 12 only is shown, partly broken away, in FIG. 1) so as to permit adjustment in orientation and in position of the flash-tube 2 with respect to the crystal 1; the flash-tube 2 is connected to a high-voltage electric source (not shown) by two electric wires 13 and 14. The end-plates 6, 7 and 10 are provided with bores 15, 16 and 17 respectively, permitting the passage of the ruby 1 when the flash-tube is adjusted or moved.

During the preliminary adjustments, the flash-tube 2 is moved away from the ruby 1 (FIG. 2) by sliding the end-plates 6 and 7 along the rods 9. The ruby 1 which is rigidly fixed to the mechanical unit 3, follows the movements of this unit 3 during the preliminary adjustments, and when the adjustments are completed, the ruby 1 is in a position (FIG. 1) such that the laser head can be employed, for example for a micromachining operation. It is only necessary to replace the flash-tube 2 in position by sliding the end-plates 6 and 7 along the rods 9.

This arrangement with a movable flash-tube can be especially fitted on a microscope, as shown in FIGS. 1 and 2. The assembly formed by the end-plates 6, 7 and 10 and by the rods 9 and 11 rests in this case on the stand 18, the ruby 1 is fixed to the optical head 19 of the microscope which can be displaced with respect to the stand 18 during the optical adjustment of the microscope; the axis XX′ of the ruby 1 and the optical axis YY′ of the head 19 are coincident within the tolerances of the mounting. The object 20 on which the optical adjustment is effected and which can be machined by means of the laser head, rests on an object-carrier plate 21 rigidly fixed to the stand 18. A light projector 22 fixed to the stand 18 sends a beam of light on to a movable mirror 23 which reflects the light and thus illuminates the object 20 by transparency.

During the optical adjustment of the microscope, the flash-tube 2 is moved away from the ruby 1 by causing the end-plates 6 and 7 to slide on the rods 9 (FIG. 2). The ruby 1 thus freed from the flash-tube 2 is rigidly fixed to the optical head 19 during its displacements in the course of optical marking, and on completion of the adjustments, the laser beam and the optical beam of the microscope are focused on the same point of the object 20. In order to use the laser head, it is then only necessary to replace the tube 2 in position round the ruby 1 by moving the unit formed by the end-plates 6 and 7 and the rods 8. FIG. 1 shows this assembly in the position of use after optical adjustment, the flash-tube 2 surrounding the ruby 1, and FIG. 2 shows this movable assembly in the top position on the rods 9 during the course of the optical adjustment of the microscope.

Figure 3:
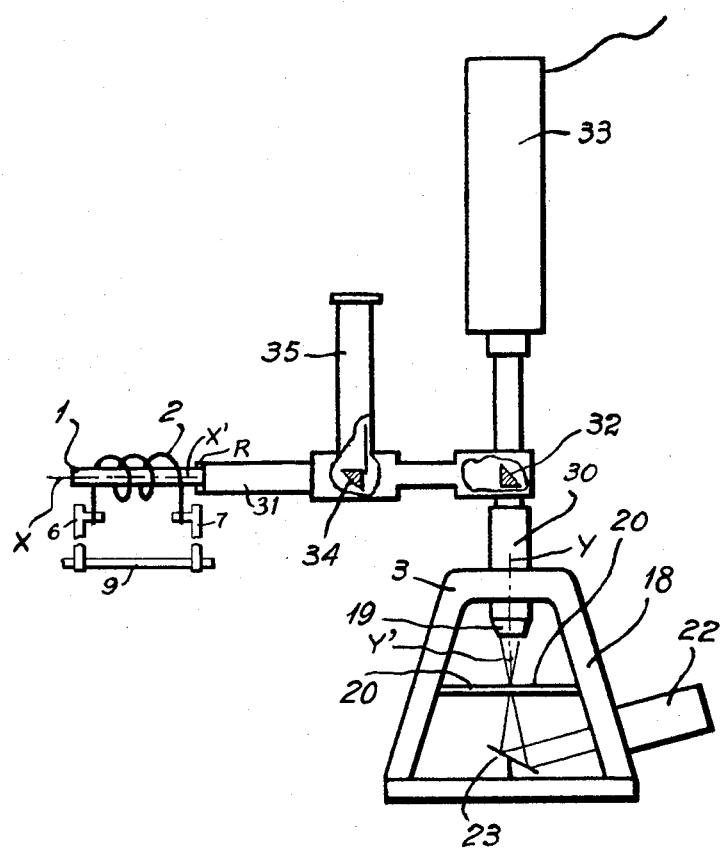
FIG. 3 shows the combination of a microscope and a laser head with a sighting eyepiece and with a television camera.

FIGS. 1 and 2 show the axis XX′ of the ruby coincident with the axis YY′ of the optical portion of the microscope. However, the invention expressly provides that these two axes are fixed together in any respective geometrical positions. They may also be perpendicular to each other, or may form any plane angle, or they may not be in the same plane, the beam of light and/or the laser beam being directed by mirrors, prisms or other optical vehicles so as finally to be applied to the same point of the workpiece to be machined. FIG. 3 shows an application of this kind of the invention.

There will again be found in FIG. 3 the same parts having the same references. The ruby 1 is however fixed to the portion 3 of the stand 18 through the intermediary of an angle bracket 30–31, in which a retractable prism 32, in the position shown in FIG. 3, sends the laser beam with the axis XX′ along the axis YY′ of the optical portion 19 of the microscope. When this prism 32 is retracted, it permits the use of a television camera 33. On the path of the laser beam is mounted a further retractable prism 34 which is withdrawn to permit the laser beam to pass. In the position shown in FIG. 3, this prism 34 permits the use of the sighting apparatus 35.

Bracket part 31 is provided with a receptacle R supporting rod 1. To explain why the laser beam does not deteriorate the lenses of the microscope, the laser beam, which is a parallel beam, traverses only the objective of the microscope, which as is well known, works at maximum aperture. Inside this objective there is no focusing point. If this were not true, the laser beam might destroy whatever would exist at such point. The laser beam exists from the objective approximately normal (at each point) to the surface of the first lens in order to converge onto the point to be fabricated.

What we claim is:

1. Apparatus comprising a laser rod, a microscope, means mechanically fixing said rod relative to said microscope, optical pumping means operatively associated with said rod to effect the generation of a laser beam, and support means supporting said pumping means for adjustment relative to said microscope and consequently with respect to said rod whereby a controlled micromachining of a workpiece is possible.

2. Apparatus as claimed in claim 1 comprising a stand supporting said microscope and said rod, said support means including support rods connected to said means including support rods connected to said stand, plates slidable on said support rods and supporting said pumping means, a bracing strut means between said plates, and means to fix the plates relative to said support rods.

3. Apparatus as claimed in claim 2, wherein said microscope and rod have angularly related axes, comprising optical means between said rod and microscope to divert said beam along the axis of the microscope and to permit optical viewing along the axis of the microscope.

4. Apparatus as claimed in claim 3 comprising a television camera optically aligned with said microscope for the viewing of the workpiece.

References Cited

UNITED STATES PATENTS

| 3,092,727 | 6/1963 | Leinhos et al. | 219—121 |
| 3,156,810 | 11/1964 | Samuelson | 219—121 |
| 3,169,183 | 2/1965 | Radtke et al. | 219—121 |
| 3,265,855 | 9/1966 | Norton | 219—121 |

RICHARD M. WOOD, *Primary Examiner.*

W. DEXTER BROOKS, *Assistant Examiner.*